(12) United States Patent
Shimizu et al.

(10) Patent No.: US 8,356,938 B2
(45) Date of Patent: Jan. 22, 2013

(54) FLUID DYNAMIC BEARING APPARATUS

(75) Inventors: Kazuto Shimizu, Aichi (JP); Toshiyuki Mizutani, Kuwana (JP); Masaharu Hori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 470 days.

(21) Appl. No.: 11/911,041

(22) PCT Filed: Mar. 20, 2006

(86) PCT No.: PCT/JP2006/305566
§ 371 (c)(1),
(2), (4) Date: Jan. 29, 2009

(87) PCT Pub. No.: WO2006/109449
PCT Pub. Date: Oct. 19, 2006

(65) Prior Publication Data
US 2009/0279817 A1    Nov. 12, 2009

(30) Foreign Application Priority Data

Apr. 7, 2005 (JP) ................................. 2005-110946
Aug. 18, 2005 (JP) ................................. 2005-237735

(51) Int. Cl.
  *F16C 17/00* (2006.01)
  *F16C 33/00* (2006.01)
(52) U.S. Cl. ...................... 384/107; 384/119; 29/898.02
(58) Field of Classification Search .................. 384/107, 384/111–115, 118, 120, 119; 29/898.02
See application file for complete search history.

(56) References Cited

U.S. PATENT DOCUMENTS

| 4,726,693 A | * | 2/1988 | Anderson et al. ............. 384/114 |
| 6,404,087 B1 | * | 6/2002 | Ichiyama ......................... 310/90 |
| 2003/0133633 A1 | | 7/2003 | Nakamura |
| 2004/0174078 A1 | | 9/2004 | Kull |

FOREIGN PATENT DOCUMENTS

| CN | 1388871 A | 1/2003 |
| JP | 9-217735 A | 8/1997 |

(Continued)

OTHER PUBLICATIONS

International Search Report of PCT/JP2006/305566, date of mailing Jun. 13, 2006.

(Continued)

*Primary Examiner* — William C Joyce
(74) *Attorney, Agent, or Firm* — Westerman, Hattori, Daniels & Adrian, LLP

(57) ABSTRACT

A fluid dynamic bearing apparatus includes shaft member 2, housing 7, sleeve portion 8, and sealing portions 9, 10. The housing 7 includes a straight cylindrical inner circumferential surface with a constant diameter and openings at both axial ends thereof. The sleeve portion 8 is provided separately from the housing 7 and fixed to the inner circumferential surface of the housing 7. A radial bearing gap is formed between the inner circumferential surface 8a of the sleeve portion 8 and the outer circumferential surface 2a of the shaft member 2, and thrust bearing gaps are formed between the end faces 9b, 10b of the sealing portions 9, 10 and the end faces 8b, 8c of the sleeve portion 8 opposing these to support the shaft member 2 in a non-contact manner in the radial direction and in the thrust direction by the hydrodynamic effect of a lubricating oil produced in each bearing gap.

4 Claims, 12 Drawing Sheets

FOREIGN PATENT DOCUMENTS

| | | | |
|---|---|---|---|
| JP | 2001-263343 | A | 9/2001 |
| JP | 2001-263344 | * | 9/2001 |
| JP | 2001-263344 | A | 9/2001 |
| JP | 2002-339956 | A | 11/2002 |
| JP | 2004-218804 | A | 8/2004 |

OTHER PUBLICATIONS

Chinese Office Action dated Nov. 13, 2009, issued in corresponding Chinese Patent Application No. 200680018807.

* cited by examiner

FLUID DYNAMIC BEARING APPARATUS

BACKGROUND OF THE INVENTION

The present invention relates to a fluid dynamic bearing apparatus which relatively rotatably supports a shaft member by a lubricating film of a fluid produced in a bearing gap.

Fluid dynamic bearing apparatuses are recently used as bearings for motors mounted on information appliances and various other electrical machinery and apparatuses because of their excellent rotational accuracies, high-speed rotation properties, quietness and other properties. More specifically, fluid dynamic bearing apparatuses are used as bearing apparatuses for spindle motors mounted on information appliances such as for HDD and like magnetic disk apparatuses, CD-ROM, CD-R/RW, DVD-ROM/RAM and like optical disk apparatuses, and MD, MO and like magneto-optic disk apparatuses, and as bearing apparatuses for polygon scanner motors for laser beam printers (LBP), collar wheel motors of projectors, and motors such as fan motors and the like.

Fluid dynamic bearings of this type are roughly classified into: hydrodynamic bearings comprising a hydrodynamic pressure producing part for producing hydrodynamic pressure action in a lubricating fluid in a bearing gap; and so-called cylindrical bearings (bearings having a bearing cross section in a perfect circle shape) comprising no hydrodynamic pressure producing part.

For example, in a fluid dynamic bearing apparatus integrated into a spindle motor of HDD and like disk drive units, a radial bearing portion which supports a shaft member in the radial direction and a thrust bearing portion which supports the shaft member in the thrust direction are both constituted of hydrodynamic bearings in some cases. FIG. 8 shows an example of such a constitution, wherein a radial bearing portion R which supports a shaft member 20 in the radial direction in a non-contact manner, and a thrust bearing portion T which supports the shaft member in the thrust direction in a non-contact manner are provided. As a bearing of this radial bearing portion R, hydrodynamic bearings in which grooves (hydrodynamic grooves) for producing hydrodynamic pressure are provided on the inner circumferential surface of a cylindrical sleeve member 80 are known. Known examples of the thrust bearing portion T include hydrodynamic bearings in which hydrodynamic grooves are provided on both end faces of a flange portion 20b of the shaft member 20, or on the faces opposing these (an end face 81 of the sleeve member 80, an end face 71a of a thrust member 71 fixed on a housing 70, etc.) (for example, refer to Japanese Unexamined Patent Publications No. 2003-239951, No. 2003-336636, and No. 2003-65324).

As is often the case with the hydrodynamic bearing apparatuses of this type, the sleeve member 80 is usually fixed in a predetermined position of the inner periphery of the housing 70, and a sealing portion 100 is installed in an opening portion of the housing 70 to prevent leakage of a lubricating oil poured into the inner space of the housing 70 to the outside. The inner circumferential surface of the sealing portion 100 forms a sealing space S between itself and the outer circumferential surface of the shaft member 20, and the capacity of this sealing space S is set to be greater than the amount of a change of the capacity of the lubricating oil filling the inner space of the housing 70 caused by thermal expansion and contraction within the operating temperature range. Therefore, even when there is a change in the capacity of the lubricating oil due to a change in temperature, the oil level of the lubricating oil is always maintained within the sealing space (refer to Japanese Unexamined Patent Publication No. 2003-65324).

BRIEF SUMMARY OF THE INVENTION

As mentioned above, in the hydrodynamic bearing apparatus shown in FIG. 8, the sealing space S is formed between the inner circumferential surface of the sealing portion 100 and the outer circumferential surface of the shaft member 20. In order to impart a function to absorb an amount of a change in the capacity of the lubricating oil (buffering function) due to a change in temperature to this sealing space S, a large space needs to be reserved for the axial dimension of the sealing space S (sealing portion 100). In this case, there arises, by design, the necessity to lower the axial center position of the sleeve member 80 relatively to the bottom side (the side opposite to the sealing portion 100) of the housing 70 in the inside of the housing 70. This increases the separation distance between the bearing center of the radial bearing portion R and the center of gravity of the body of rotation, and a value of tolerance for moment load may be insufficient depending on the used conditions and the like.

Furthermore, thrust bearing portions T are provided on both sides of the flange portion of the shaft member 20 so that the axial distance between both thrust bearing portions T, T is reduced. Therefore, the value of tolerance for the moment load by the thrust bearing portion T tends to be lowered correspondingly. In particular, in case of a hydrodynamic bearing apparatus for use in a disk drive unit, a relatively large moment load acts on the shaft member 20 as a rotor (body of rotation having a rotor hub, rotor magnet, disk, clamper and other components mounted thereon) rotates, and therefore moment load capacity is a significant characteristic.

Moreover, to ensure the buffering function of the sealing space S, the axial dimension of the sealing space S (sealing portion 100) has to be inevitably large, but this makes it difficult to meet the requirements of reduction in thickness of bearing apparatuses.

Moreover, in order to enhance the buffering function of the sealing space S, a method of reserving a large opposing interval between the inner circumferential surface of the sealing portion 100 forming the sealing space S and the outer circumferential surface of the shaft member 20 is also possible, but in this manner, the lubricating oil in the sealing space S may undesirably leak readily to the outside of the bearing upon impact or due to other causes.

As mentioned above, an object of the present invention is to provide a fluid dynamic bearing apparatus having an increased a value of tolerance for a moment load.

To achieve the above object, the present invention provides a fluid dynamic bearing apparatus comprising a bearing member which comprises a sleeve member and openings at both axial ends thereof, a shaft member which is inserted at the inner periphery of the sleeve member, sealing portions which are provided on the shaft member in a manner of protruding toward its outer diameter side and disposed in the opening portions at both ends of the bearing member, sealing spaces which are formed on the outer peripheries of both sealing portions, respectively, and a radial bearing portion which supports the shaft member in the radial direction in a non-contact manner by the hydrodynamic effect of a lubricating oil produced in a radial bearing gap between the inner circumferential surface of the sleeve member of the bearing member and the outer circumferential surface of the shaft member.

According to the constitution mentioned above, sealing spaces are formed in the opening portions at both ends of the bearing member. As already mentioned, the sealing spaces have a function to absorb an amount of a change in capacity caused by a change in temperature of the lubricating oil filling the inner space of the bearing apparatus (buffering function). Forming the sealing spaces in the opening portions at both ends of the bearing member can increase the buffering function of the entire bearing apparatus than in the case where the sealing space is formed only at one end side opening portion (refer to FIG. 8). Therefore, reducing the capacity of each sealing space, in other words, reducing the axial dimension of the sealing portion is possible. Accordingly, the axial dimension of the bearing member can be increased and the separation distance between the radial bearing portions provided in a plurality of positions in the axial direction can be increased so that a value of tolerance for a moment load can be increased. Alternatively, the axial dimension of the sealing portion can be reduced while the axial dimension of the bearing member remains as it is, whereby the axial dimension of such a bearing apparatus can be reduced.

In the fluid dynamic bearing apparatus of this type, the inner spaces of the bearing apparatus such as the radial bearing gap needs to be filled with the lubricating oil after the apparatus has been assembled. When a housing whose one axial end is closed is used as shown in FIG. 8, such an operation is not easy, and is often carried out by using special apparatuses and steps. For example, the bearing apparatus is immersed into the lubricating oil under reduced pressure, and is then exposed to the atmospheric pressure. In this case, the lower the pressure, the less the air remaining inside the bearing apparatus. However, since there is a limit in reducing pressure, generation of remaining air cannot be avoided. In contrast, in the present invention, both ends of the bearing member are open to atmosphere, and therefore the operation of filling the oil can be readily conducted. For example, the oil can be poured while pressurizing the lubricating oil even under atmospheric pressure (ordinary pressure) conditions. Therefore, the operation of filling the oil can be carried out at low costs, and the amount of air remaining inside the bearing apparatus can be reduced.

The sealing portions can be used not only as the components for forming the sealing spaces, but also as components for forming the thrust bearing gaps. An example of possible constitutions is such that a thrust bearing gap is formed between an end face of the sleeve member and the end face of one of the sealing portions opposing this, whereby a first thrust bearing portion which retains the shaft member and the bearing member in the thrust direction in a non-contact manner by the hydrodynamic effect of the lubricating fluid produced in the thrust bearing gap is formed.

In addition, the thrust bearing gap can be also formed between an end face of the sleeve member and the end face of the other sealing portion opposing this. Accordingly, a second thrust bearing portion which retains the shaft member and the bearing member in the thrust direction in a non-contact manner by the hydrodynamic effect of the lubricating fluid produced in the thrust bearing gap is constituted.

In this constitution, the first thrust bearing portion and the second thrust bearing portion are formed at both axial ends of the bearing member. Therefore, the separation distance between the thrust bearing portions in the axial direction becomes greater than in the constitution where the thrust bearing portions are provided on both sides of the flange portion of the shaft member (refer to FIG. 8), and thus the value of tolerance for a moment load by the thrust bearing portions is increased correspondingly.

Constituting the bearing member by the sleeve members disposed in a plurality of positions in the axial direction, and spacer portions interposed between the sleeve members facilitates the construction of a plurality of radial bearing portions spaced in the axial direction by forming a hydrodynamic pressure producing part on each sleeve. Moreover, when each sleeve member is formed of an oil-containing sintered metal, the spacer portions can be formed of a material which does not have a porous structure (non-porous material). In this case, the amount of the lubricating oil contained in the bearing apparatus is reduced (because the inside of the spacer portions are not impregnated with the lubricating oil). Since the amount of a change in capacity of the lubricating oil caused by the thermal expansion and contraction thereof is proportionate to the total amount of the lubricating oil contained in the bearing apparatus, the capacities of the sealing spaces can be reduced by a decrease in the total amount of the oil.

The widths of the sealing spaces (axial dimension) may be uniform in the axial direction, but from the perspective of increasing the sealing property, the sealing spaces preferably have a tapered configuration whose dimensions gradually decrease toward the inside of the bearing member in the axial direction. When the sealing spaces have the above-mentioned tapered configurations, the lubricating oil inside the sealing spaces is drawn toward the direction in which the sealing spaces become narrower by the capillary force. Accordingly, leakage of the lubricating oil to the outside can be effectively prevented. Examples of the means for achieving such a constitution include a means of forming tapered faces whose diameters gradually decrease toward the outside of the bearing member on the outer circumferential surfaces of the sealing portions, and a means of forming a tapered face whose diameter gradually increases toward the outside of the bearing member on the inner circumferential surface at an end of the bearing member. Especially according to the former means, the sealing portions rotate with the shaft member, whereby the drawing action by the centrifugal force during rotation, in addition to the drawing action by the above-mentioned capillary force, can be also obtained (so-called centrifugal force seal). Thus, leakage of the lubricating oil from the inside of the housing to the outside is prevented even more effectively.

The fluid dynamic bearing apparatus having the above constitution has high rotational accuracy and durability, and can be desirably used for a motor having a rotor magnet and a stator coil, for example, for a spindle motor for HDD and the like.

To achieve the object, the present invention provides a fluid dynamic bearing apparatus comprising a housing portion, a sleeve member provided inside the housing portion, a shaft member which rotates relative to the housing portion and sleeve portion, a radial bearing portion which rotatably supports the shaft member in the radial direction by a lubricating film of a fluid produced in a radial bearing gap between the sleeve portion and the shaft member, and an annular sealing portion positioned at least one end side of the sleeve portion, the sealing portion being provided on the shaft member, a sealing space being formed on the outer circumferential surface side of the sealing portion, the outer circumferential surface which faces the sealing space of the sealing portion having process-induced marks produced during machining of the outer circumferential surface, and the process-induced marks having such a configuration that can draw the fluid inside the sealing space into the housing portion.

As mentioned above, the present invention is characterized in that the sealing spaces are provided on the outer circumferential surface side of the sealing portion provided on the shaft member. According to this, positions in which the sealing spaces are formed can be moved closer to the outer diameter side than in a known example so that the sealing capacity can be increased. Accordingly, a sealing capacity which is sufficient to absorb an amount of change in volume of a fluid (for example, lubricating oil) filling the inner space of the housing portion caused by a change in temperature of the fluid can be reserved, and at the same time the axial dimensions of the sealing spaces (sealing portion) can be reduced. Therefore, the position of the axial center of the sleeve portion relative to the housing portion can be set relatively closer to the sealing portion side than in a known example. Accordingly, the separation distance between the bearing center of the radial bearing portion and the center of gravity of the body of rotation can be shortened so that a value of tolerance for a moment load can be increased.

The present invention is also characterized in that the outer circumferential surface which faces the sealing space of the sealing portion has process-induced marks produced during machining of this outer circumferential surface, and that the process-induced marks have such a configuration that can draw the fluid inside the sealing spaces into the housing portion.

As mentioned above, the axial dimension of the sealing portion can be reduced by arranging the sealing spaces closer to the outer diameter side. Meanwhile, reduction of the axial dimensions of the sealing spaces may cause spattering of the lubricant oil inside the sealing space to the outside, for example, upon impact. The present invention has been made in light of such a point. According to the above constitution, the fluid inside the sealing space is drawn into the housing portion by the process-induced marks produced on the outer circumferential surface of the sealing portion. Therefore, the radial dimension of the sealing spaces can be made large to a certain degree, in other words, the sealing capacity in the sealing spaces can be ensured, while high sealing performance can be imparted to the fluid dynamic bearing apparatus at the same time. Moreover, since the above process-induced marks are formed simultaneously with machining of the outer circumferential surface of the sealing portion on its outer circumferential surface, a process for forming a means for producing the drawing action of the above fluid on the sealing portion in addition to the machining of the sealing portion is not necessary, whereby processing steps can be simplified.

It is desirable that the above process-induced marks are, for example, spiral cutting marks produced during a lathe turning process. In this case, uniform cutting marks can be obtained throughout the outer periphery of the sealing portion. Accordingly, the drawing action of the fluid into the housing portion (inside of the bearing) is uniformly produced in the circumferential direction of the sealing spaces. Therefore, leakage of the fluid to the outside of the bearing can be prevented firmly.

The widths of the sealing spaces (axial dimension) may be uniform in the axial direction, but from the perspective of increasing the sealing property, it is desirable that the sealing spaces have tapered configurations whose dimensions gradually decrease toward the inside of the bearing. The lubricating oil inside the sealing spaces is drawn toward the decreasing direction of the sealing spaces (for example, toward the inside of the housing portion) by the capillary force by giving the above tapered configurations to the sealing spaces. Accordingly, leakage of the lubricating oil to the outside of the bearing can be effectively prevented. Examples of constitutions in which sealing spaces having such configurations are formed include one that having a tapered face whose diameter gradually decreases toward the outside of the housing portion formed on the outer circumferential surface of the sealing portion. According to such a constitution, the action by which the lubricating oil inside the sealing spaces is drawn to the narrower side along the tapered face by the centrifugal force (centrifugal force sealing action) can be obtained during rotation of the shaft member, in addition to the drawing action caused by the capillary force of the above process-induced marks and the tapered sealing spaces, and leakage of the lubricating oil is thus prevented more effectively.

For the reasons mentioned above, the present invention can provide a fluid dynamic bearing apparatus having an increased a value of tolerance for a moment load. Alternatively, a fluid dynamic bearing apparatus in which the axial dimension of the hydrodynamic bearing apparatus is made compact can be provided.

According to the present invention, a fluid dynamic bearing apparatus having high sealing function, in addition to the high value of tolerance for the moment load, can be provided.

DETAILED DESCRIPTION OF THE INVENTION

The first to fifth embodiments of the present invention will be described below with reference to FIGS. 1 to 7.

Figure 1:
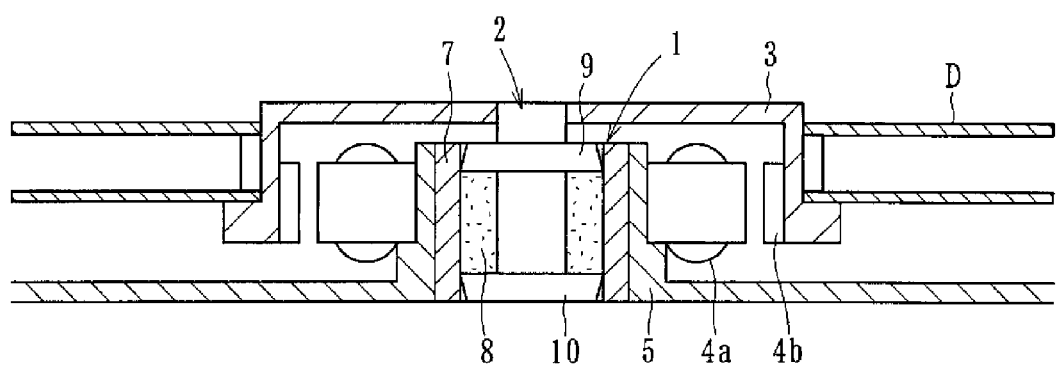
FIG. 1 is a cross-sectional view of a motor integrating a fluid dynamic bearing apparatus according to a first embodiment of the present invention.

FIG. 1 conceptionally shows a constitutional example of a spindle motor for information appliances integrating the fluid dynamic bearing apparatus (hydrodynamic bearing apparatus) 1 according to the first embodiment of the present invention. This spindle motor for information appliances is for use in a disk drive unit such as HDD, and comprises a fluid dynamic bearing apparatus 1, a rotor (disk hub) 3 attached to a shaft member 2 of the fluid dynamic bearing apparatus 1, a stator coil 4a and a rotor magnet 4b which, for example, oppose each other across a gap in the radial direction, and a bracket 5. The stator coil 4a is attached to the outer periphery of the bracket 5, and the rotor magnet 4b is attached to the inner periphery of the disk hub 3. The disk hub 3 retains one or more disks D such as magnetic disks on its outer periphery. When the stator coil 4a is energized, the rotor magnet 4b is rotated by the electromagnetic force generated between the stator coil 4a and rotor magnet 4b, and the disk hub 3 and shaft member 2 rotate together accordingly.

Figure 2:
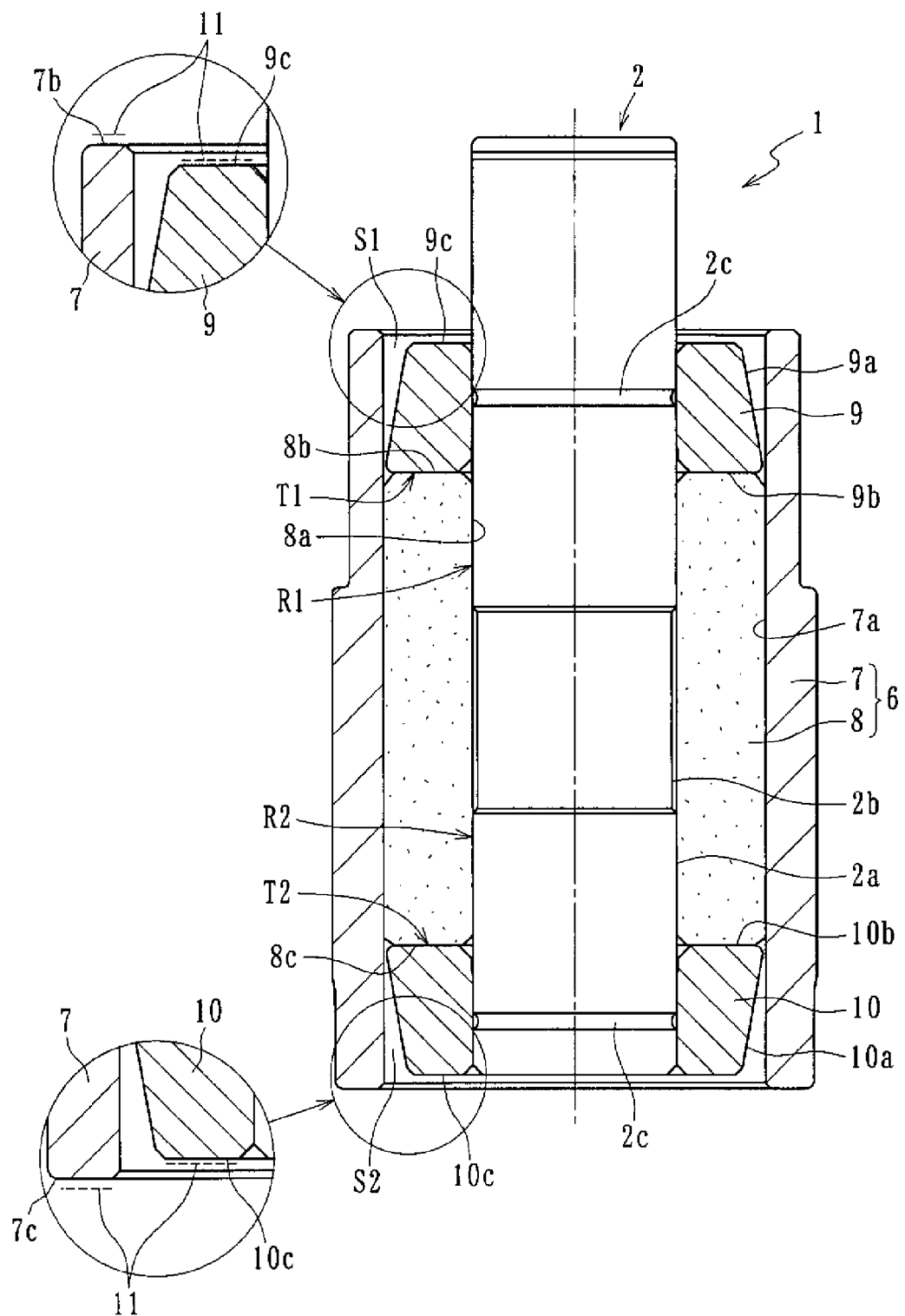
FIG. 2 is a cross-sectional view of a fluid dynamic bearing apparatus according to the first embodiment.

FIG. 2 shows the fluid dynamic bearing apparatus 1 used in the above spindle motor. This fluid dynamic bearing apparatus 1 is constituted of, as main structural components, a shaft member 2 which serves as a rotation side component, a bearing member 6 which serves as a fixed side component, a first sealing portion 9 and a second sealing portion 10 which are fixed on the shaft member 2. In the embodiment shown in FIG. 2, the bearing member 6 which serves as the fixed side component is constituted of a housing 7 and a sleeve portion 8 separately. In the description below, for the sake of explanation, the side on which an end portion of the shaft member 2 is protruding from the opening portion of the bearing member 6 is referred to as the upper side, and the side opposite to it in the axial direction is referred to as the lower side.

A first radial bearing portion R1 and a second radial bearing portion R2 are provided separately in the axial direction between the inner circumferential surface 8a of the sleeve portion 8 and the outer circumferential surface 2a of the shaft member 2. Moreover, a first thrust bearing portion T1 is provided between the upper end face 8b of the sleeve portion 8 and the lower end face 9b of the first sealing portion 9, and a second thrust bearing portion T2 is provided between the lower end face 8c of the sleeve portion 8 and the upper end face 10b of the second sealing portion 10.

The shaft member 2 is formed of a metallic material such as stainless steel, or has a hybrid structure of a metal and a resin. The shaft member 2 as a whole has a shaft-like shape with an approximately constant diameter, and has an undercut portion 2b which is formed in a middle portion thereof and has a diameter slightly smaller than other portions. In the outer circumferential surface 2a of the shaft member 2, recesses, for example, circumferential grooves 2c are formed in the fixed positions of the first and second sealing portions 9, 10.

The housing 7 is formed, for example, cylindrically by injection-molding a resin material, and its inner circumferential surface 7a has a straight cylinder face with a constant diameter. The outer circumferential surface of the housing 7 is fixed to the inner circumferential surface of the bracket 5 shown in FIG. 1 by press fitting, adhesion, press fitting adhesion or other means.

The resin which forms the housing 7 is mainly a thermoplastic resin. Examples of usable resins which are noncrystalline include polysulfone (PSF), polyethersulfone (PES), polyphenylsulfone (PPSF), polyetherimide (PEI) and the like, and those which are crystalline include liquid crystal polymers (LCP), polyether ether ketone (PEEK), polybutylene terephthalate (PBT), polyphenylene sulfide (PPS) and the like. Moreover, the types of a filler added to the above-mentioned resin are not especially limited. Examples of usable fillers include glass fibers and like fibrous fillers, potassium titanate and like whisker fillers, mica and like scale-like fillers, and carbon fiber, carbon black, graphite, carbon nanomaterial, metal powders and like fibrous or powdery conductive fillers. These fillers may be used singly or in combination of two or more kinds. In this embodiment, a resin material prepared by adding 2 to 8 wt. % of carbon fiber or carbon nanotube as a conductive filler to a liquid crystal polymer (LCP) as a crystalline resin, is used as a material for forming the housing 7.

The housing 7 can be also formed of brass, aluminium alloy and like soft metallic materials, and other metallic materials.

The sleeve portion 8 is cylindrically formed of, for example, a porous body comprising a sintered metal, in particular a porous body of a sintered metal comprising copper as a main ingredient, and is fixed to a predetermined position of the inner circumferential surface 7a of the housing 7 by press fitting, adhesion, press fitting adhesion or other means. The sleeve portion 8 can be also formed of other metal materials than sintered metals, such as copper alloys.

Figure 3A:
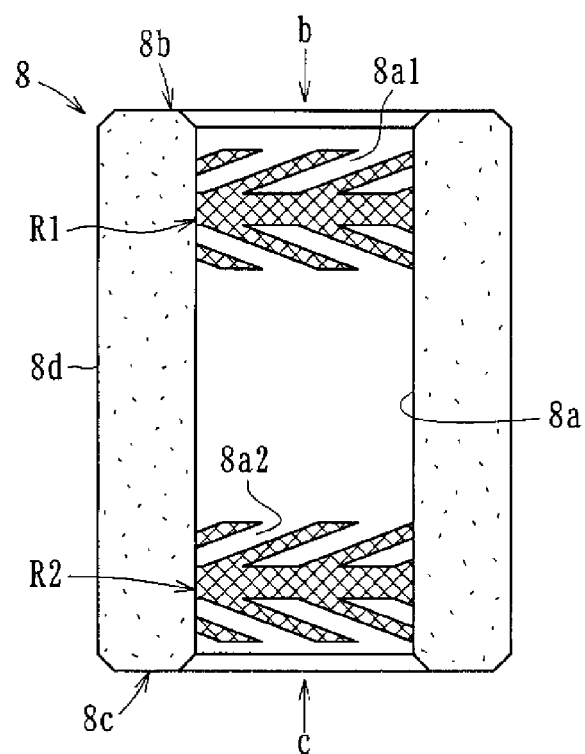
FIG. 3A is a cross-sectional view of the sleeve portion.
Figure 3B:
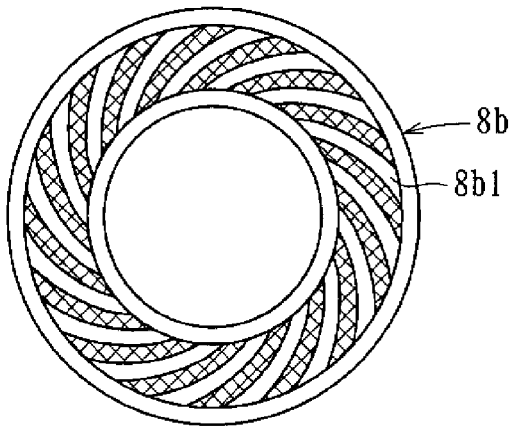
FIG. 3B is a top view of the sleeve portion in FIG. 3A seen from the direction of arrow b.
Figure 3C:
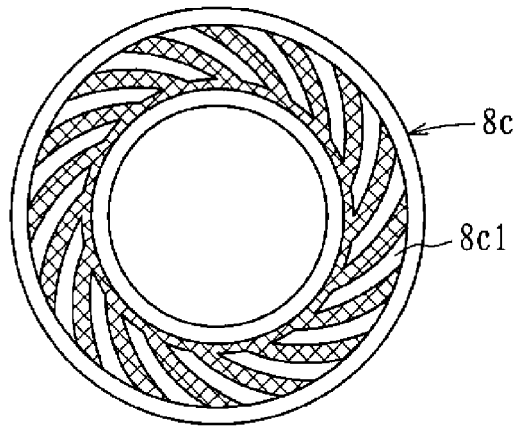
FIG. 3C is a top view of the sleeve portion in FIG. 3A seen from the direction of arrow c.

On the inner circumferential surface 8a of the sleeve portion 8, two regions, i.e., upper and lower regions, which serve as the radial bearing faces of the first radial bearing portion R1 and the second radial bearing portion R2 are provided separately in the axial direction, and hydrodynamic grooves 8a1, 8a2 having, for example, a herringbone shape as shown in FIG. 3 (a) are formed in the two regions, respectively.

The first sealing portion 9 and second sealing portion 10 are both formed in the shape of a ring of brass or like soft metallic material, other metallic material, or a resin material, and are fixed to predetermined positions of the outer circumferential surface 2a of the shaft member 2, for example, with an adhesive. A thermosetting adhesive can be used as the adhesive. In this case, the sealing portions 9, 10 can be securely fixed on the shaft member 2 by heating (baking) the shaft member 2 after positioning the sealing portions 9, 10 with respect to the shaft member 2. At this time, the adhesive applied to the shaft member 2 fills the circumferential grooves 2c serving as an adhesive reservoir and undergoes curing, whereby the adhesive strength of the sealing portions 9, 10 to the shaft member 2 is improved.

The outer circumferential surface 9a of the first sealing portion 9 forms a first sealing space S1 having a predetermined capacity between itself and the inner circumferential surface 7a of the opening portion at the upper end of the housing 7, and the outer circumferential surface 10a of the second sealing portion 10 forms a second sealing space S2 having a predetermined capacity between itself and the inner circumferential surface 7a of the opening portion at the lower end of the housing 7. In this embodiment, the outer circumferential surface 9a of the first sealing portion 9 and the outer circumferential surface 10a of the second sealing portion 10 are formed in the shape of tapered faces whose diameters gradually increase toward the outside of the bearing apparatus, respectively. Accordingly, both sealing spaces S1, S2 have tapered configurations whose diameters decrease gradually in the direction of approaching each other. When the shaft member 2 is in rotation, the lubricating oil in the sealing spaces S1, S2 is drawn the toward the direction in which the sealing spaces become narrower by the drawing action caused by the capillary force and the drawing action caused by the centrifugal force during rotation. Accordingly, leakage of the lubricating oil from the inside of the housing 7 is effectively prevented. To prevent oil leakage more firmly, as shown in the enlarged drawing of FIG. 2, a coating of an oil repellent agent 11 can be formed on the upper end face 7b and lower end face 7c of the housing 7, the upper end face 9c of the first sealing portion 9, and the lower end face 10c of the second sealing portion 10.

The first and second sealing spaces S1, S2 have a buffering function to absorb the amount of a change in capacity caused by a change in temperature of the lubricating oil filling the inner space of the housing 7. the oil level is always within the sealing spaces S1, S2 in a contemplated range of change in temperature. To achieve this, the sum total of the capacities of the sealing spaces S1, S2 is set to be greater than at least an amount of a change in capacity caused by a change in temperature of the lubricating oil filling the inner space.

The assembly of the housing 7 and sleeve portion 8 having the above-mentioned constitution and between the sealing portions 9, 10 thereof and the shaft member 2 are carried out, for example, as follows: That is, the outer circumferential surface of the sleeve portion 8 is fixed to the sleeve portion 8, and the shaft member 2 with one sealing portion (for example, the first sealing portion 9) fixed thereon is then inserted at the inner periphery of the sleeve portion 8. The other sealing portion (for example, the second sealing portion 10) is then fixed to the shaft member 2, completing the assembly stated above. When the assembly is finished in such a manner, the inner space of the housing 7 sealed by the sealing portions 9, 10 is filled with, for example, a lubricating oil as a lubricating fluid, including the inner pores of the sleeve portion 8.

The lubricating oil is poured into the inner space of the fluid dynamic bearing apparatus 1, for example, by immersing an empty hydrodynamic bearing apparatus in a vacuum chamber into the lubricating oil, and then exposing it to the atmospheric pressure. At this time, as shown in FIG. 1, since both ends of the housing 7 (bearing member 6) are open, the air in the inner space can be replaced by the lubricating oil more effectively than in the case where one end of the housing is closed (refer to FIG. 8), and adverse effects caused by remaining air, for example, oil leakage at a high temperature and other problems can be securely avoided. Moreover, it is also possible to employ not only such a method of pouring oil utilizing decompression, but also pouring oil under atmospheric pressure (for example, pressurized pouring of the lubricating oil), which can simplify a device and steps of pouring oil to reduce production costs.

When the shaft member 2 is in rotation, the regions which serve as the radial bearing faces of the inner circumferential surface 8a of the sleeve portion 8 (upper and lower regions) oppose the outer circumferential surface 2a of the shaft member 2, respectively, across the radial bearing gap. Moreover, the region which serves as the thrust bearing face of the upper end face 8b of the sleeve portion 8 opposes the lower end face 9b of the first sealing portion 9 across a predetermined thrust bearing gap, and the region which serves as the thrust bearing face of the lower end face 8c of the sleeve portion 8 opposes the upper end face 10b of the second sealing portion 10 across a predetermined thrust bearing gap. As the shaft member rotates, the hydrodynamic pressure of the lubricating oil is generated in the above radial bearing gap, and the shaft member 2 is rotatably supported in a non-contact manner in the radial direction by an oil film of the lubricating oil formed in the radial bearing gap. Accordingly, the first radial bearing portion R1 and the second radial bearing portion R2 which rotatably support the shaft member 2 in the radial direction in a non-contact manner are constituted. Simultaneously, the hydrodynamic pressure of the lubricating oil is generated in the above thrust bearing gap, and the shaft member 2 and the sealing portions 9, 10 are rotatably supported in a non-contact manner in the thrust direction by an oil film of the lubricating oil formed in the above thrust bearing gap. Accordingly, the first thrust bearing portion T1 and second thrust bearing portion T2 which rotatably support the shaft member 2 in the thrust direction in a non-contact manner are constituted.

In the present invention, the sealing spaces S1, S2 are formed between the outer circumferential surfaces 9a, 10a of the sealing portions 9, 10 projecting from the shaft member 2 to the outer diameter side and the inner circumferential surface 7a of the housing 7. Therefore, reduction in the wall thickness of the sealing portions 9, 10 in the axial direction can be achieved and at the same time ensuring the capacity required for the sealing spaces can be achieved more efficiently than in the case where the sealing space is formed between the sealing portions fixed to the housing and the outer circumferential surface of the shaft member (refer to FIG. 8). In addition, since the sealing spaces S1, S2 are formed on both sides of the sleeve portion 8 in the axial direction, the buffering function of the lubricating oil by the sealing spaces can be increased in the entire bearing apparatus than in the case where the sealing space is formed at only one end of the sleeve portion in the axial direction (refer to FIG. 8), whereby the capacity of each of the sealing spaces S1, S2 can be less than that of the sealing space S. Accordingly, for example, the axial dimension of the sleeve portion 8 can be reduced than in an known example, or the axial length of the sleeve portion 8 can be increased than in a known example to increase the interval in the axial direction between the hydrodynamic groove region of the first radial bearing portion R1 and the hydrodynamic groove region of the second radial bearing portion. According to the former, the axial dimension of the hydrodynamic bearing apparatus can be reduced than in a known example, while according to the latter, a value of tolerance for a moment load can be increased.

Figure 8:
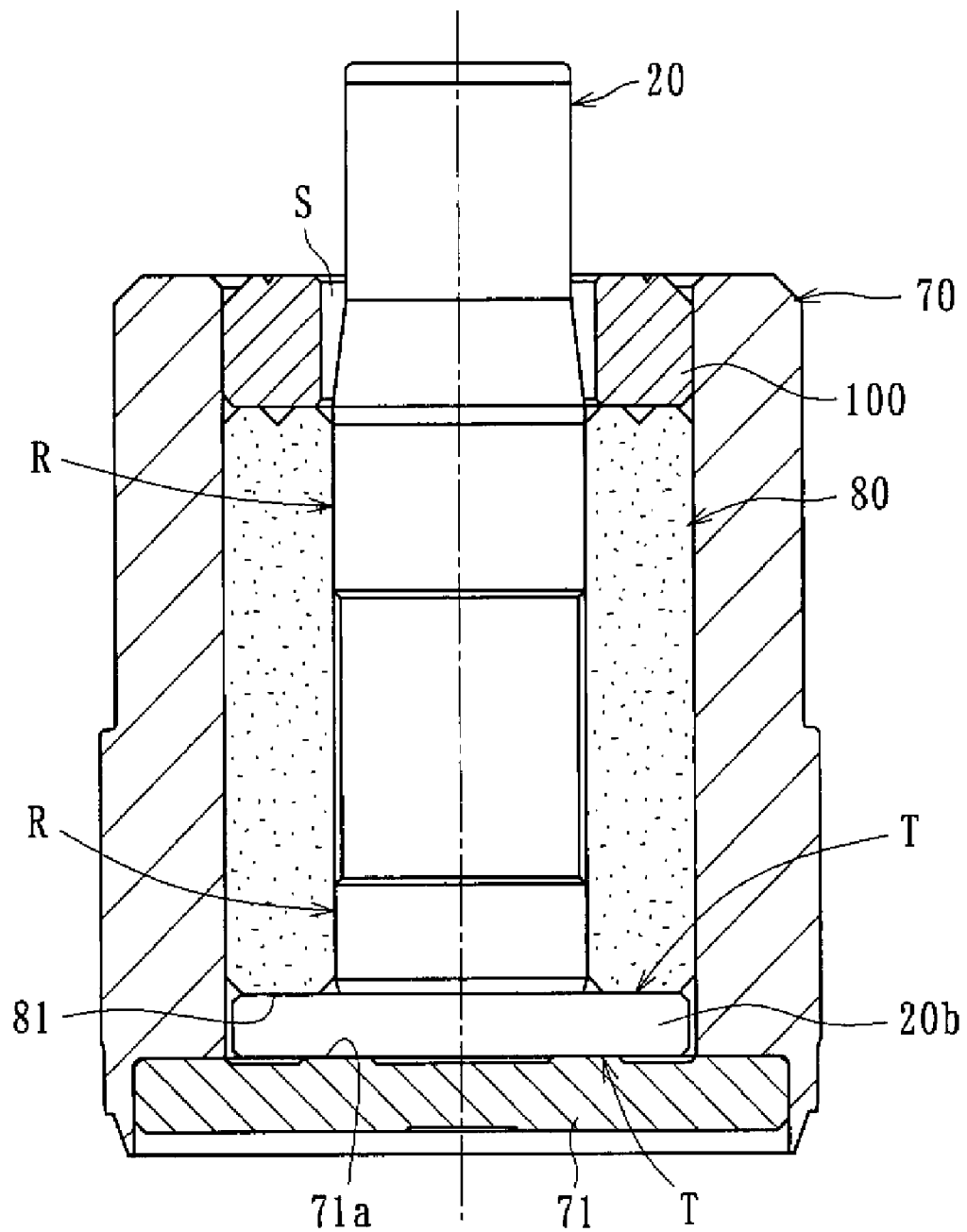
FIG. 8 is a cross-sectional view of a fluid dynamic bearing apparatus according to a known literature.

According to the constitution shown in FIG. 2, the configuration of the housing 7 can be simpler than that of the structure shown in FIG. 8. Therefore, its costs of molding can be reduced.

Figure 4:
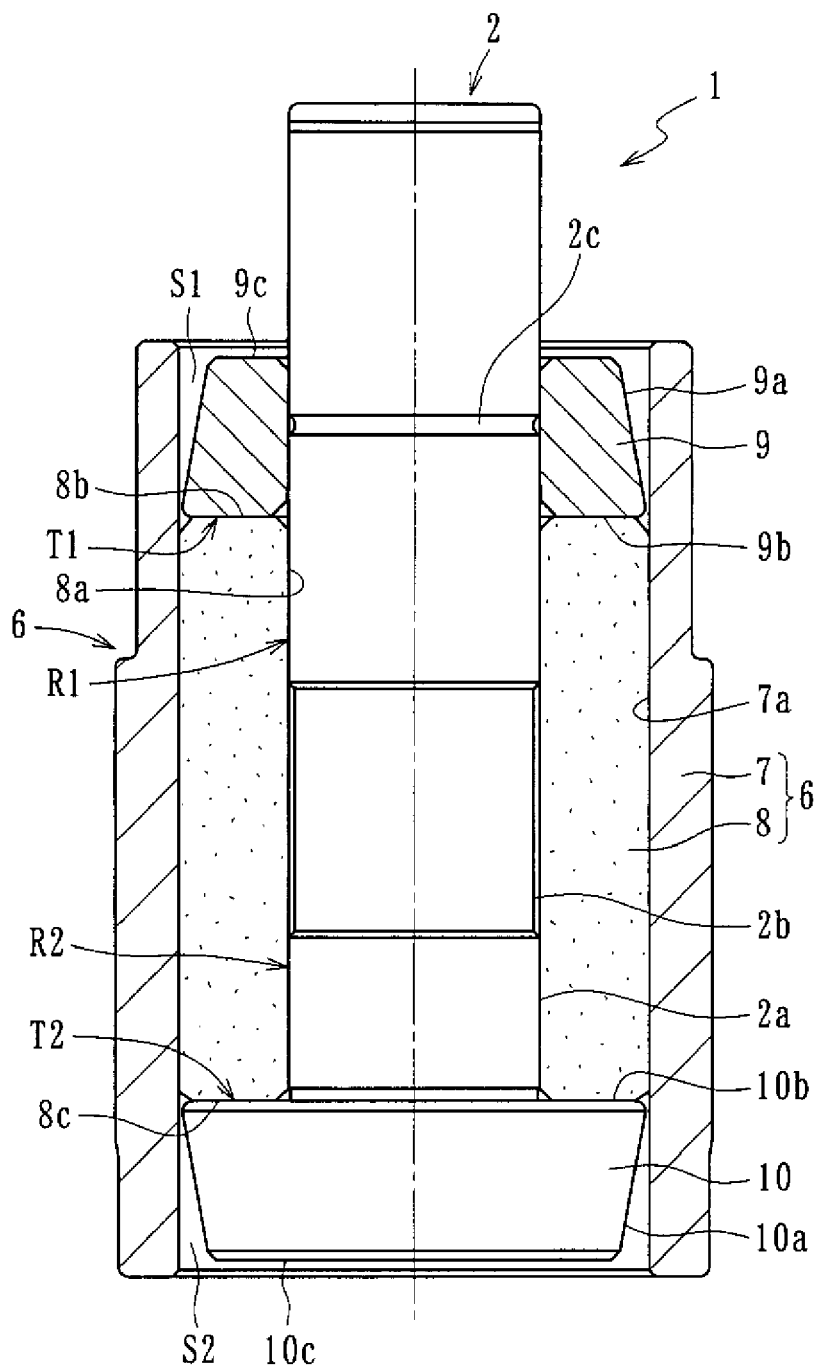
FIG. 4 is a cross-sectional view of a fluid dynamic bearing apparatus according to a second embodiment of the present invention.

FIG. 4 shows the second embodiment of the fluid dynamic bearing apparatus (hydrodynamic bearing apparatus) 1. The fluid dynamic bearing apparatus 1 of this embodiment differs from that of the first embodiment in that one of the first sealing portion 9 and second sealing portion 10 (the second sealing portion 10 in FIG. 4) is formed integrally with the shaft member 2. Accordingly, variation in the assembly precision (for example, perpendicularity) between the shaft member 2 and the sealing portion 10 in fixing the sealing portion 10 can be suppressed, and controlling precision in the assembly can be facilitated. Moreover, as in the first embodiment, the configuration of the housing 7 can be simpler than in the structure shown in FIG. 8, and the number of parts can be further reduced by at least the thrust member 71.

Figure 5:
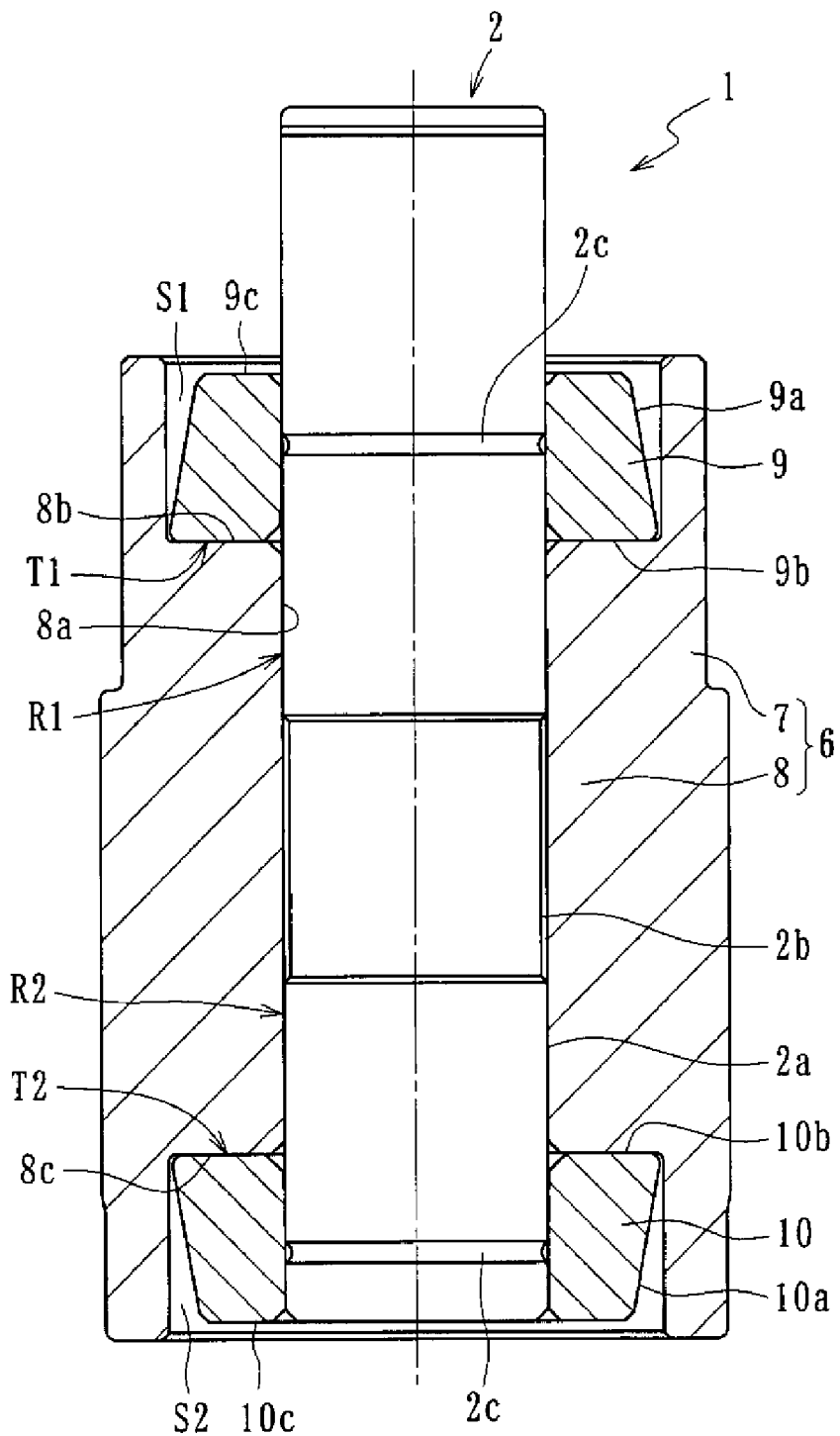
FIG. 5 is a cross-sectional view of a fluid dynamic bearing apparatus according to a third embodiment of the present invention.

FIG. 5 shows the third embodiment of the fluid dynamic bearing apparatus (hydrodynamic bearing apparatus) 1. The fluid dynamic bearing apparatus 1 of this embodiment differs from that of the first embodiment in that the housing 7 and sleeve portion 8 are integrally formed to make the bearing member 6 a single part so that reduction in the number of parts and assembling man-hours, and thus further cost reduction can be achieved. This bearing member 6 can be formed by forging or machining a soft metal or other metallic material, or by injection molding, or further by MIM molding a resin or a low-melting metal.

In this case, in the bearing member 6, a radial bearing gap is formed between the inner circumferential surface of the sleeve portion 8 and the outer circumferential surface of the shaft member 2, and thrust bearing gaps are formed between the upper end face 8b of the sleeve portion 8 and the lower end face 9b of the sealing portion 9, and between the lower end face 8c of the sleeve portion 8 and the upper end face 10b of the sealing portion 10, respectively. Moreover, the sealing spaces S1, S2 are formed between the inner circumferential surface 7a of the opening portions at both ends of the bearing member 6 (the opening portions at both ends of the portion 7 corresponding to the housing) and the outer circumferential surfaces of the sealing portions 9, 10, respectively.

Figure 6:
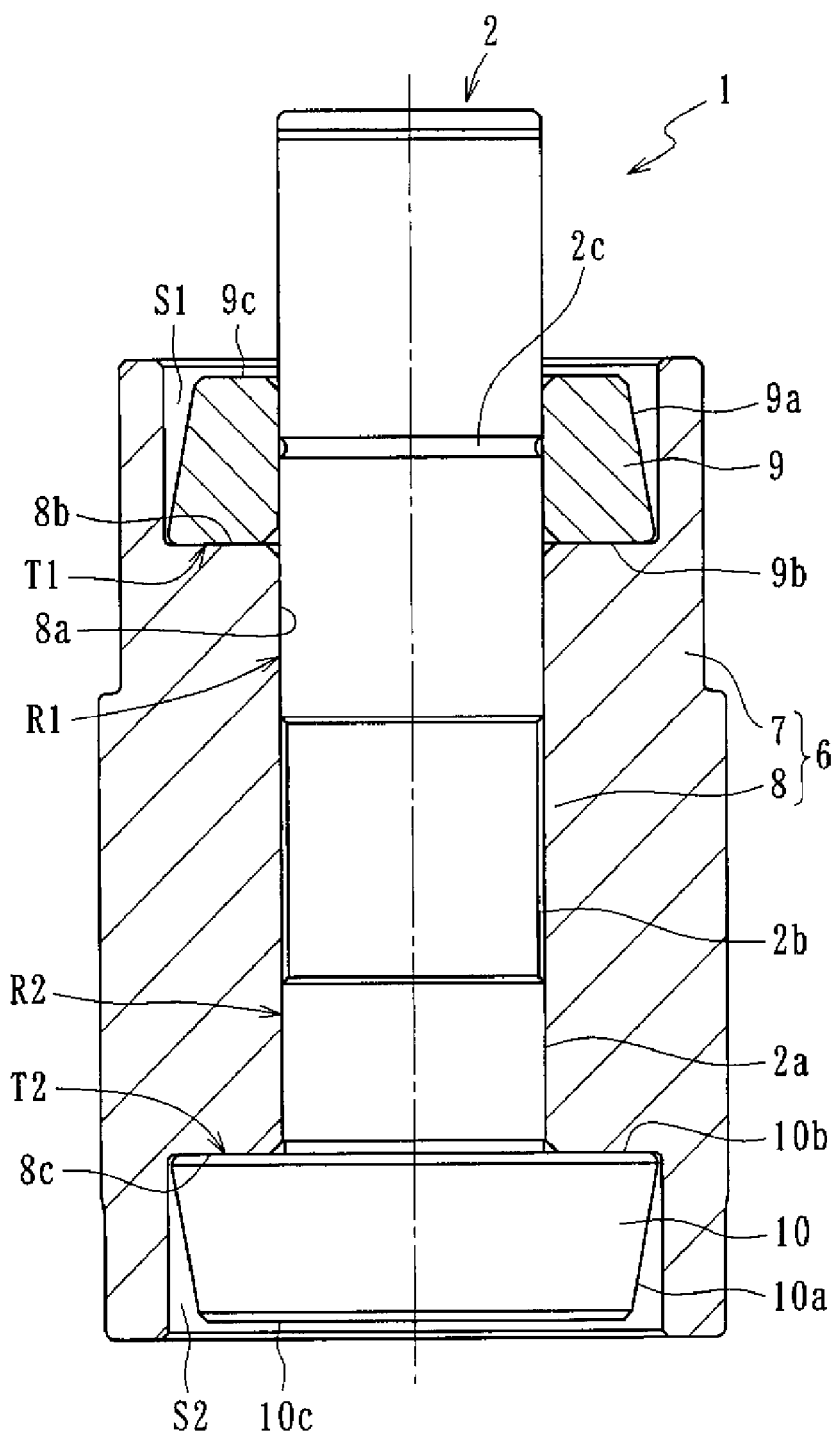
FIG. 6 is a cross-sectional view of a fluid dynamic bearing apparatus according to a fourth embodiment of the present invention.

FIG. 6 shows the fourth embodiment of the fluid dynamic bearing apparatus (hydrodynamic bearing apparatus) 1. The fluid dynamic bearing apparatus 1 of this embodiment differs from that of the first embodiment in that one of the first sealing portion 9 and second sealing portion 10 (the second sealing portion 10 in FIG. 4) is formed integrally with the shaft member 2 and that the housing 7 and sleeve portion 8 are integrally formed to make the bearing member 6 a single part.

Figure 7:
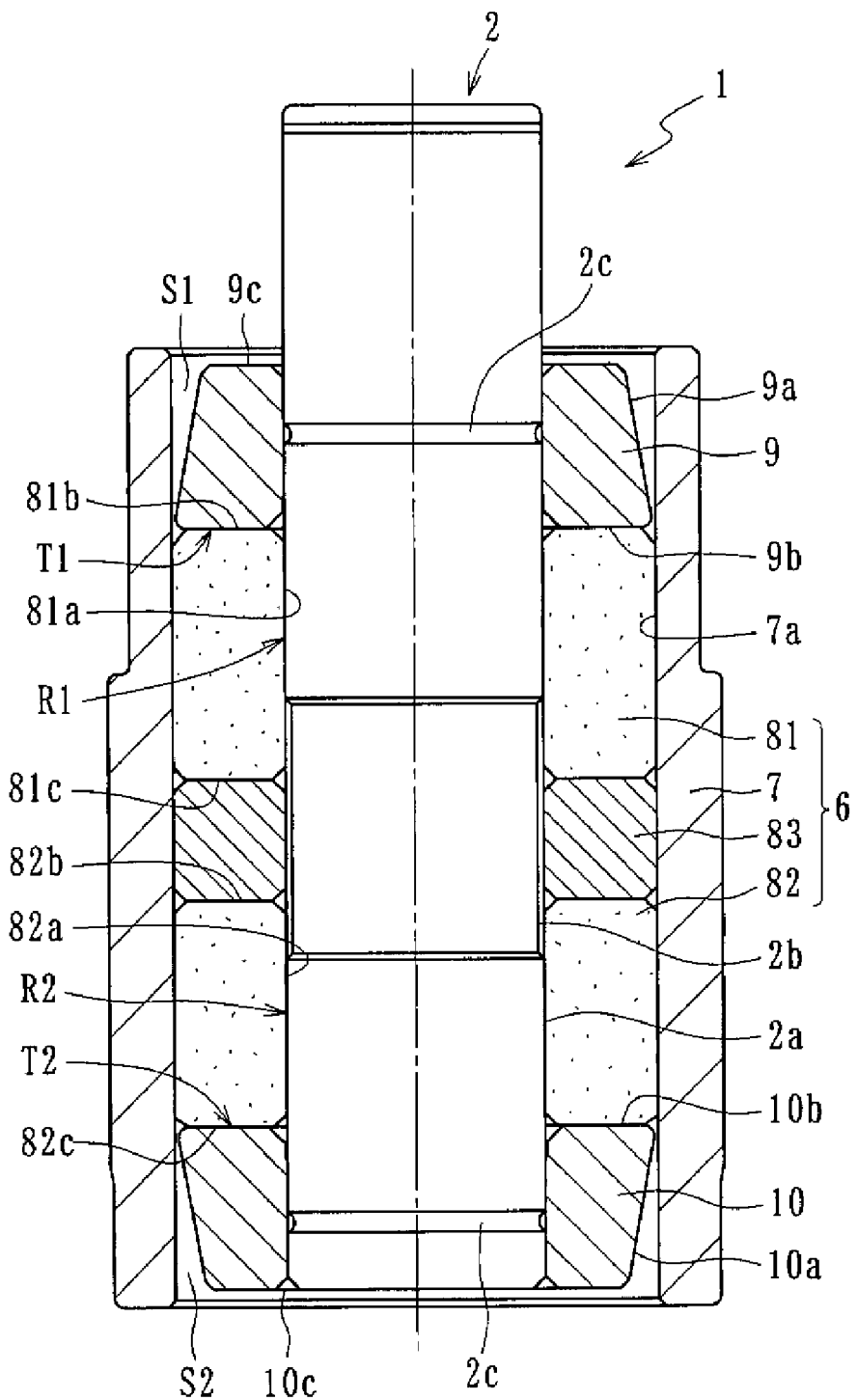
FIG. 7 is a cross-sectional view of a fluid dynamic bearing apparatus according to a fifth embodiment of the present invention.

FIG. 7 shows the fifth embodiment of the fluid dynamic bearing apparatus (hydrodynamic bearing apparatus) 1. This fluid dynamic bearing apparatus differs from the first embodiment shown in FIG. 2 in that the sleeve portion is constituted of an upper sleeve portion 81 and a lower sleeve portion 82 and that an annular spacer portion 83 is interposed between the two sleeve portions. The spacer portion 83 is annularly formed of a soft metallic material such as brass (brass), other metallic material, or a resin material, and does not have a porous structure as the upper sleeve portion 81 and lower sleeve portion 82. The bearing member 6 is constituted of these upper sleeve portion 81, lower sleeve portion 82, spacer portion 83, and housing 7.

The first radial bearing portion R1 is provided between the inner circumferential surface 81a of the upper sleeve portion 81 and the outer circumferential surface 2a of the shaft member 2, and the second radial bearing portion R2 is provided between the inner circumferential surface 82a of the lower sleeve portion 82 and the outer circumferential surface 2a of the shaft portion 2a. Moreover, the first thrust bearing portion T1 is provided between the upper end face 81b of the upper sleeve portion 81 and the lower end face 9b of the first sealing member 9, and the second thrust bearing portion T2 is provided between the lower end face 82c of the lower sleeve portion 82 and the upper end face 10b the second sealing member 10.

Since the non-porous spacer portion 83 which does not have a porous structure is interposed between the upper sleeve portion 81 and the lower sleeve portion 82, the total amount of the lubricating oil filling the inner space of the bearing apparatus can be less than that in the fluid dynamic bearing apparatus 1 of the above-mentioned embodiment (because the inside of the spacer portion 83 is not impregnated with the lubricating oil). Meanwhile, the amount of a change in capacity of the lubricating oil caused by the thermal expansion and contraction thereof is proportionate to the total amount of the lubricating oil filling the inner space of the bearing apparatus. Therefore, the capacity of the sealing space S can be reduced by a decrease in the total amount of the oil. Therefore, the fluid dynamic bearing apparatus 1 of this embodiment can achieve further reduction in the axial dimension of the sealing member 9.

In the embodiment shown in FIG. 7, the spacer portion 83 can be also fixed on the shaft member 2. In this case, the first thrust bearing portion T1 can be formed between the lower end face 81c of the upper sleeve portion 81 and the upper end face of the spacer portion 83, and the second thrust bearing portion T2 can be formed between the upper end face 82b of the lower sleeve portion 82 and the lower end face of the spacer portion 83. It should be noted that all of the fluid dynamic bearing apparatuses 1 (hydrodynamic bearing apparatuses) according to the embodiments described above (the second to fifth embodiments) can be used by being integrated into, for example, the spindle motor shown in FIG. 1.

In the above description, the constitutions in which the hydrodynamic effect of the lubricating oil is produced by the hydrodynamic grooves having the herringbone shape and spiral configuration are shown as examples of the radial bearing portions R1, R2 and the thrust bearing portions T1, T2, but the present invention is not limited to these examples.

For example, so-called step bearings and multirobe bearings may be employed as the radial bearing portions R1, R2.

Figure 9:
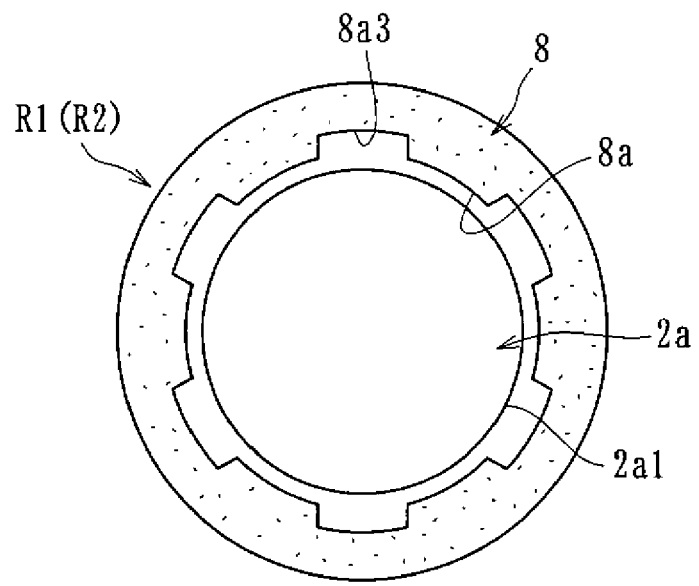
FIG. 9 is a cross-sectional view showing another constitutional example of the radial bearing portion.

FIG. 9 shows an example of the case where one or both of the radial bearing portions R1, R2 are constituted of step bearings. In this example, a plurality of axial groove-shaped hydrodynamic grooves 8a3 are provided at predetermined intervals in the circumferential direction in the regions which serve as the radial bearing faces of the inner circumferential surface 8a of the sleeve portion 8.

Figure 10:
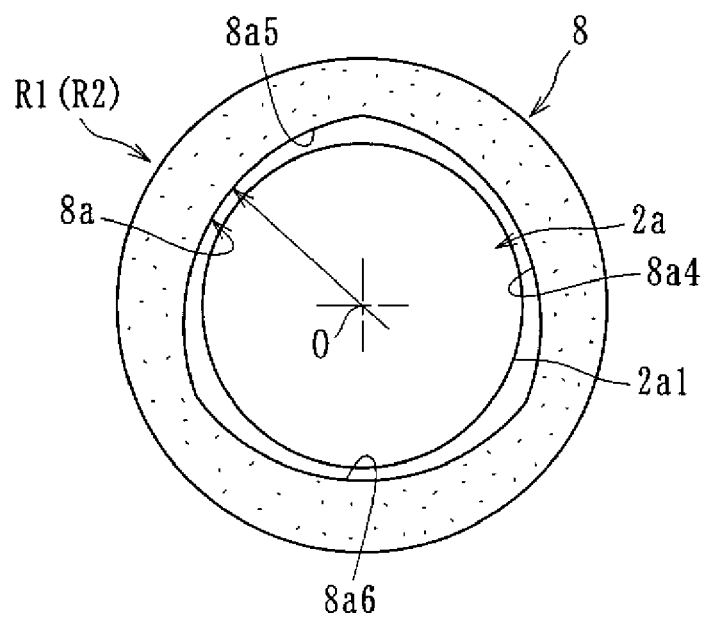
FIG. 10 is a cross-sectional view showing another constitutional example of the radial bearing portion.

FIG. 10 shows an example of the case where one or both of the radial bearing portions R1, R2 are constituted of multirobe bearings. In this example, the regions which serve as the radial bearing faces of the inner circumferential surface 8a of the sleeve portion 8 are constituted of three arcuate faces 8a4, 8a5, 8a6 (so-called three-lobe bearing). The centers of curvature of the three arcuate faces 8a4, 8a5, 8a6 are offset at equal distances from the axial center O of the sleeve portion 8 (shaft portion 2a), respectively. In each of the regions demarcated by the three arcuate faces 8a4, 8a5, 8a6, the radial bearing gaps have a configuration whose dimension gradually decreases in the shape of a wedge relative to both circumferential directions. Accordingly, when the sleeve portion 8 and the shaft portion 2a relatively rotate, the lubricating oil in the radial bearing gaps is pushed toward the narrowest side of the gaps whose dimensions decrease in the shape of a wedge, depending on the direction of the relative rotation, and the pressure is thus increased. The sleeve portion 8 and the shaft portion 2a are supported in a non-contact manner by such hydrodynamic effect of the lubricating oil. Deeper axial grooves, which are referred to as separation grooves, may be formed in the boundary portions between each of the three arcuate faces 8a4, 8a5, 8a6.

Figure 11:
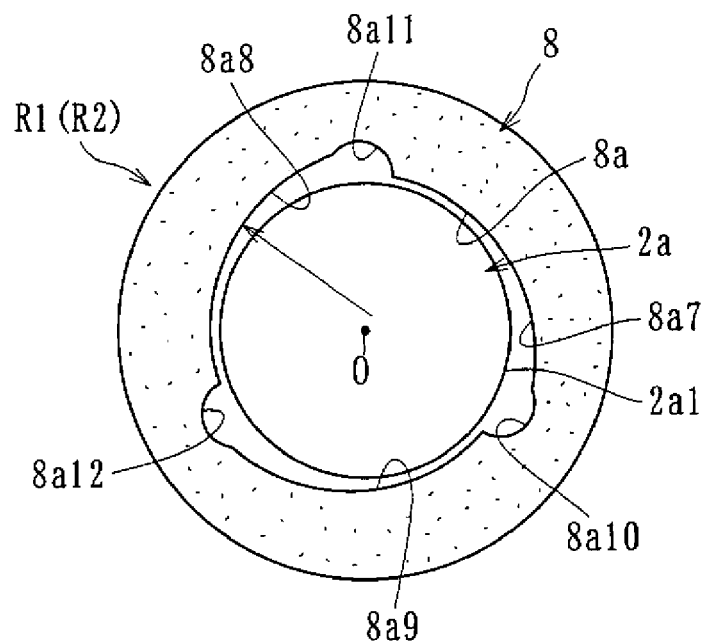
FIG. 11 is a cross-sectional view showing another constitutional example of the radial bearing portion.

FIG. 11 shows another example of the case where one or both of the radial bearing portions R1, R2 are constituted of multirobe bearings. Also in this example, the regions which serve as the radial bearing faces of the inner circumferential surface 8a of the sleeve portion 8 are constituted of three arcuate faces 8a7, 8a8, 8a9 (so-called three-lobe bearing). In each of the regions demarcated by these three arcuate faces 8a7, 8a8, 8a9, the radial bearing gap has a configuration whose dimension gradually decreases in the shape of a wedge relative to one of the two circumferential directions. The thus-constituted multirobe bearing is sometimes referred to as a taper bearing. Moreover, in the boundary portions between each of the three arcuate faces 8a7, 8a8, 8a9, deeper axial grooves 8a10, 8a11, 8a12, which are referred to as separation grooves, are formed. Accordingly, when the sleeve portion 8 and the shaft portion 2a relatively rotate in a predetermined direction, the lubricating oil in the radial bearing gap are pushed toward the narrowest side of the gap whose dimension decreases in the shape of a wedge, and the pressure is thus increased. The sleeve portion 8 and the shaft portion 2a are supported in a non-contact manner by such hydrodynamic effect of the lubricating oil.

Figure 12:
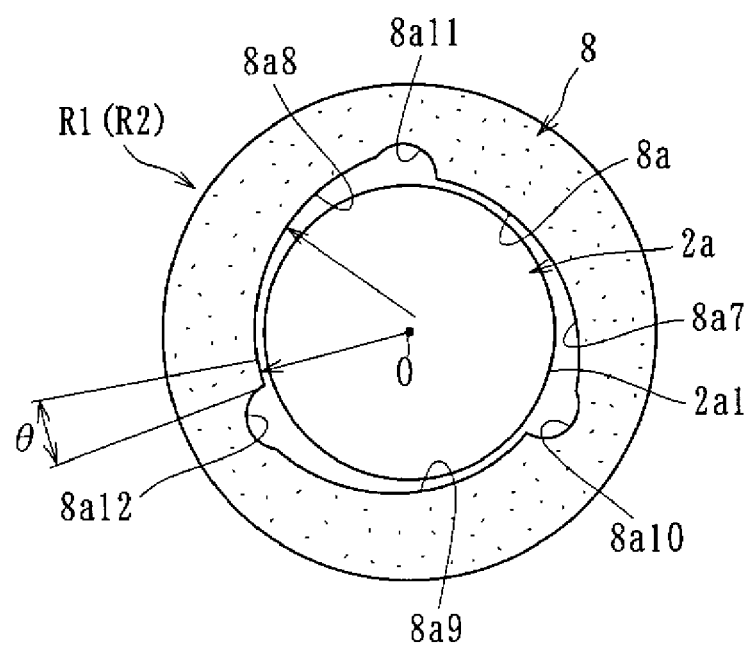
FIG. 12 is a cross-sectional view showing another constitutional example of the radial bearing portion.

FIG. 12 shows another example of the case where one or both of the radial bearing portions R1, R2 are constituted of multirobe bearings. In this example, in the constitution shown in FIG. 11, each of predetermined regions θ on the narrowest side of the gaps of the three arcuate faces 8a7, 8a8, 8a9 is constituted of concentric arcs whose centers of curvature are the axial center O of the sleeve portion 8 (shaft portion 2a). Therefore, in each of the predetermined regions θ, the radial bearing gap (narrowest gap) is constant. The thus-constituted multirobe bearing is sometimes referred to as a taper flat bearing.

Although the multirobe bearing in the examples described above is a so-called three-lobe bearing, it is not limited to this, and a so-called four-lobe bearing, five-lobe bearing, and a multirobe bearing comprising six or more arcuate faces may be employed. Moreover, when the radial bearing portions are constituted of step bearings or multirobe bearings, two radial bearing portions may be separately provided in the axial direction as the radial bearing portions R1, R2, or a single radial bearing portion may be provided across the upper and lower regions of the inner circumferential surface 8a of the sleeve portion 8.

One or both of the thrust bearing portions T1, T2 may be constituted of a so-called step bearing in which a plurality of radial groove-shaped hydrodynamic grooves are provided, for example, in the regions which serve as thrust bearing faces, at predetermined intervals in the circumferential direction, a so-called wave bearing (in which the steps are in the shape of waves) and like bearings.

Furthermore, in the above description, the case where the hydrodynamic grooves 8a1, 8a2 of the first and second radial bearing portions R1, R2 are formed on the inner circumferential surface 8a of the sleeve portion 8 is shown as an example, but these grooves may be formed on the opposing face across the radial bearing gap, namely, the outer circumferential surface 2a of the shaft member 2. Furthermore, the case where the hydrodynamic grooves 8b1, 8c1 of the first and second thrust bearing portions T1, T2 are formed on both end faces 8b, 8c of the sleeve portion is shown as an example, but these grooves can be also formed on the opposing faces across the thrust bearing gap, namely, the lower end face 9b of the first sealing portion 9 and the upper end face 10b of the second sealing portion 10.

The sixth embodiment of the present invention will be described below with reference to FIGS. 13 to 15.

Figure 13:
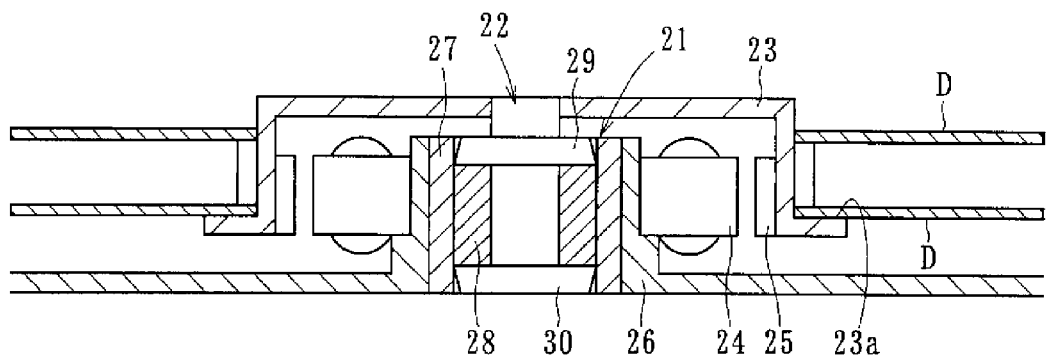
FIG. 13 is a cross-sectional view of a motor integrating a fluid dynamic bearing apparatus according to a sixth embodiment of the present invention.

FIG. 13 conceptually shows a constitutional example of a spindle motor for information appliances integrating a fluid dynamic bearing apparatus (hydrodynamic bearing apparatus) 21 according to the sixth embodiment of the present invention. This spindle motor is for use in a disk drive unit such as HDD, and comprises a fluid dynamic bearing apparatus 21 which rotatably supports a shaft member 22, a disk hub 23 fixed on the shaft member 22, a stator coil 24 and a rotor magnet 25 which, for example, oppose each other across a gap in the radial direction, and a bracket 26. The stator coil 24 is attached to the outer periphery of the bracket 26, and the rotor magnet 25 is attached to the inner periphery of the disk hub 23. The fluid dynamic bearing apparatus 21 is fixed to the inner periphery of the bracket 26. One or more (two in FIG. 13) disks D as information recording media are retained on the disk hub 23. In the spindle motor constituted in the manner described above, when the stator coil 24 is energized, the rotor magnet 25 is rotated by excitation generated between the stator coil 24 and the rotor magnet 25, whereby the disk hub 23 and the disks D retained on the disk hub 23 rotate together with the shaft member 22.

Figure 14:
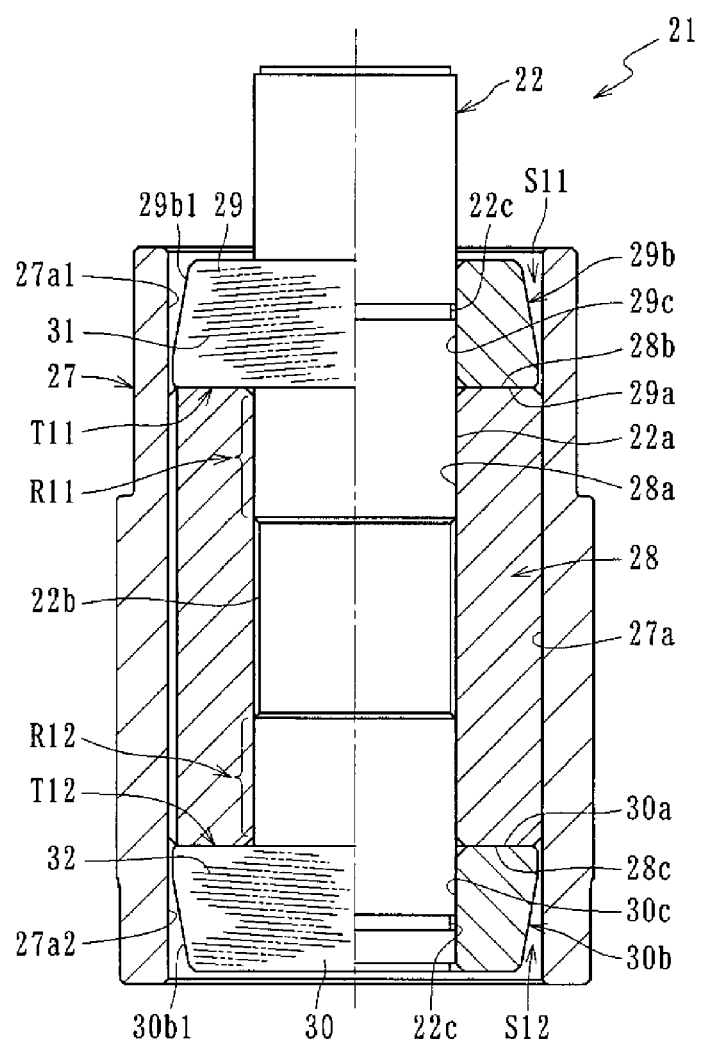
FIG. 14 is a cross-sectional view of the fluid dynamic bearing apparatus according to the sixth embodiment.

FIG. 14 shows the fluid dynamic bearing apparatus 21. This fluid dynamic bearing apparatus 21 comprises a housing portion 27, a sleeve portion 28 fixed to the inner periphery of the housing portion 27, a shaft member 22 which rotates relative to the housing portion 27 and sleeve portion 28, a first sealing portion 29 and a second sealing portion 30 which are spaced in the axial direction and fixed to the shaft member 22, and form a first sealing space S11 and a second sealing space S12 at both axial ends of the housing portion 27. For the sake of explanation, the side to which the press-in side end of the disk hub 23 of the shaft member 22 protrudes from the fluid dynamic bearing apparatus 21 is referred to as the upper side, and the side opposite to the projecting side of the shaft member 22 is referred to as the lower side in the description below.

The housing portion 27 forms a cylindrical shape which are open at both ends, and is formed by injection-molding, for example, a metal such as brass, or a crystalline resin such as LCP, PPS, and PEEK, a resin composition based on a non-crystalline resin such as PPSU, PES and PEI. The inner circumferential surface 27a of the housing portion 27 has a constant diameter in the axial direction and a straight cylinder face, and has a sleeve portion 28 fixed in a middle position in its axial direction.

The sleeve portion 28 is formed, for example, of a non-porous body made of a metal or a porous body made of a sintered metal in a cylindrical shape. In this embodiment, the sleeve portion 28 is cylindrically formed of a porous body of a sintered metal comprising copper as a main ingredient, and is fixed to the inner circumferential surface 27a of the housing portion 27, for example, by adhesion (including loose adhesion), press fitting (including press fitting adhesion), welding (including ultrasonic welding) and like suitable means. The sleeve portion 28 can be of course formed of a non-metal material such as a resin and a ceramic.

In the entire inner circumferential surface 28a of the sleeve portion 28 or a partial cylindrical region thereof, a region in which a plurality of hydrodynamic grooves are arranged as a radial hydrodynamic pressure producing part is formed. In this embodiment, for example, as shown in FIG. 15 (a), two regions in which a plurality of hydrodynamic grooves 28a1, 28a2 are arranged in a herringbone shape are formed separately in the axial direction. The regions in which these hydrodynamic grooves 28a1, 28a2 are formed oppose the outer circumferential surface 22a of the shaft member 22 as the radial bearing faces, and when the shaft member 22 is in rotation, the radial bearing gaps of the first, second radial bearing portions R11, R12, which will be described later, are formed between the radial bearing faces and the outer circumferential surface 22a, respectively (refer to FIG. 14).

Figure 15A:
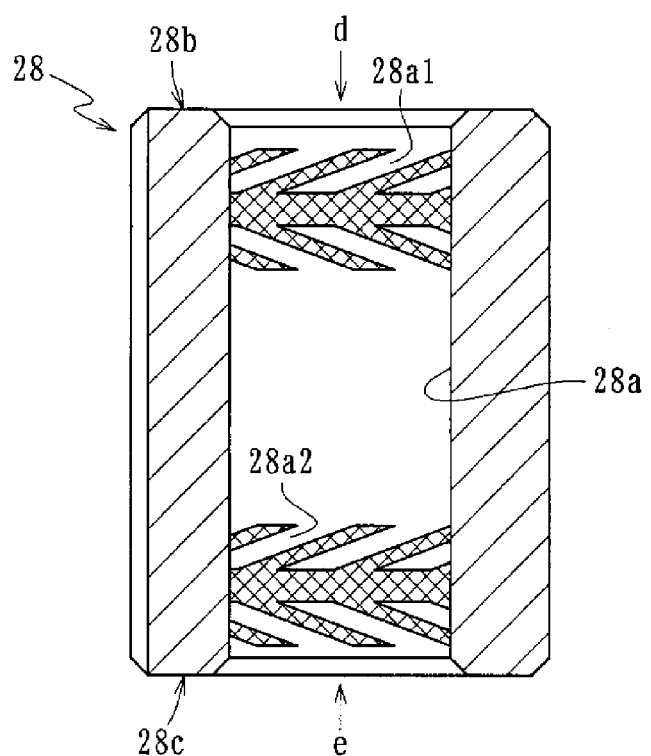
FIG. 15A is a cross-sectional view of the sleeve portion.
Figure 15B:
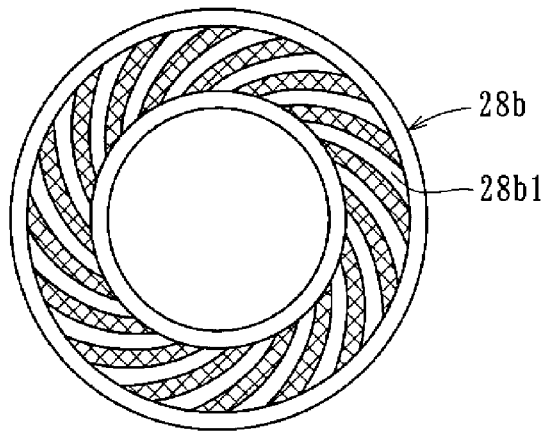
FIG. 15B is a top view of the sleeve portion in FIG. 15A seen from the direction of arrow d.
Figure 15C:
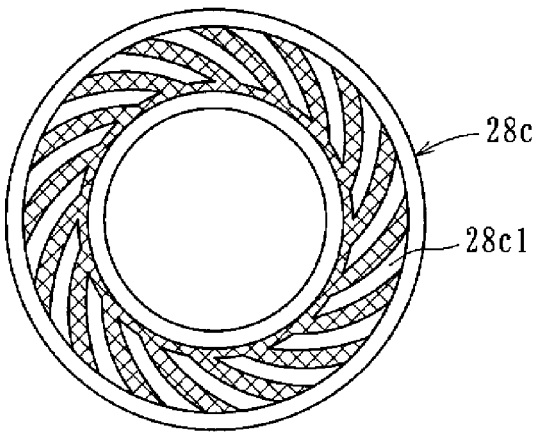
FIG. 15C is a top view of the sleeve portion in FIG. 15A seen from the direction of arrow e.

In the entire upper end face 28b of the sleeve portion 28 or a partial annular region thereof, for example, as shown in FIG. 15 (b), a region in which a plurality of hydrodynamic grooves 28b1 are arranged in a spiral shape is formed as a thrust hydrodynamic pressure producing part. This region in which the hydrodynamic grooves 28b1 are formed opposes the lower end face 29a of the first sealing portion 29 as a thrust bearing face, and when the shaft member 22 is in rotation, it forms the thrust bearing gap of a first thrust bearing portion T11, which will be described later, between the thrust bearing face and the lower end face 29a (refer to FIG. 14).

In the entire lower end face 28c of the sleeve portion 28 or a partial annular region thereof, for example, as shown in FIG. 15 (c), a region in which a plurality of hydrodynamic grooves 28c1 are arranged in a spiral shape is formed as a thrust hydrodynamic pressure producing part. This region in which the hydrodynamic grooves 28c1 are formed opposes the upper end face 30a of the second sealing portion 30 as a thrust bearing face, and when the shaft member 22 is in rotation, its forms the thrust bearing gap of a second thrust bearing portion T12, which will be described later, between the thrust bearing face and the upper end face 30a (refer to FIG. 14).

The shaft member 22 is formed of, for example, a metallic material such as stainless steel, and is inserted at the inner periphery of the sleeve portion 28. The shaft member 22 as a whole forms a shaft-like shape having an approximately constant diameter, and an undercut portion 22b having a diameter slightly smaller than other portions is formed in an axial middle portion on its outer circumferential surface 22a (portion which does not oppose the regions in which the hydrodynamic grooves 28a1, 28a2 are formed). Moreover, in the outer circumferential surface 22a of the shaft member 22, annular grooves 22c are formed in the regions in which the first sealing portion 29 and second sealing portion 30 are fixed, respectively. In this embodiment, the shaft member 22 is an integrally processed article made of a metal, but can be, for example, a hybrid shaft made of a metal and a resin (e.g., the sheath portion is made of a metal, and the core portion is made of a resin).

The first sealing portion 29 and second sealing portion 30 are formed annularly of, for example, a copper alloy such as brass and other metallic materials. The first sealing portion 29 is fixed to the outer periphery of the shaft member 22 in a state that its lower end face 29a opposes the upper end face 28b of the sleeve portion 28, and the second sealing portion 30 is fixed to the outer periphery of the shaft member 22 in a state that its upper end face 30a opposes the lower end face 28c of the sleeve portion 28. At this time, the value obtained by subtracting the axial dimension of the sleeve portion 28 disposed between both faces 29a, 30a from the opposing interval in the axial direction between the lower end face 29a of the first sealing portion 29 and the upper end face 30a of the second sealing portion 30 is set as the sum total of the thrust bearing gaps of the first, second thrust bearing portions T11, T12, which will be described later. In this embodiment, in the outer circumferential surface 22a of the shaft member 22, an annular groove 22c is provided in each of the regions in which the sealing portions 29, 30 are fixed. Therefore, for example, when the inner circumferential surfaces 29c, 30c of the sealing portions 29, 30 are fixed to the outer circumferential surface 22a of the shaft member 22 with an adhesive, the above annular groove 22c acts as an adhesive reservoir, whereby the adhesive strength (fixing strength) of the sealing portions 29, 30 to the shaft member 22 is improved. Of course, a means for fixing each of the sealing portions 29, 30 and the shaft member 22 is not limited to adhesion, and press fitting, adhesion combined with press fitting and other means can be also used.

On the outer circumferential surface 29b of the first sealing portion 29, as shown in FIG. 14, an annular tapered face 29b1 whose diameter gradually decreases toward the top (in the direction of spacing away from each other from the sleeve portion 28 toward the first sealing portion 29) is formed. This tapered face 29b1 is formed, for example, simultaneously by lathe turning when the outer circumferential surface 29b of the first sealing portion 29 is formed by a lathe turning process. Therefore, spiral cutting marks 31 are produced on the tapered face 29b1 of the first sealing portion 29 as a finished product, for example, as shown to the upper left in FIG. 14. Similarly, an annular tapered face 30b1 whose diameter gradually decreases toward the bottom (in the direction of spacing away from each other from the sleeve portion 28 toward the second sealing portion 30) is formed also on the outer circumferential surface 30b of the second sealing portion 30, and spiral cutting marks 32 are produced on this tapered face 30b1, for example, as shown to the lower left in FIG. 14.

The spiral cutting marks 31 produced on the tapered face 29b1 of the first sealing portion 29 are inclined relative to the horizontal direction (the direction orthogonal to the rotation shaft), and their inclination direction coincides with the inclination direction of the upper region of the hydrodynamic grooves 28a1 of the sleeve portion 28 which draw in the lubricating oil downwardly in the axial direction (refer to FIGS. 14 and 15). Such an inclination direction can be adjusted by the transfer direction (for example, from the smaller-diameter side to the larger-diameter side of the tapered face 29b1) of a cutting blade relative to a workpiece during the lathe turning process. As for the spiral cutting marks 32 produced on the tapered face 30b of the second sealing portion 30, their inclination direction also coincides with the inclination direction of the lower region of the hydrodynamic grooves 28a2 which draw in the lubricating oil upwardly in the axial direction.

In a state that the first sealing portion 29 having the above-mentioned constitution is fixed to the shaft member 22, the tapered first sealing space S11 whose radial dimension gradually decreases toward the bottom is formed between the outer circumferential surface 29b comprising tapered face 29b1 and the inner circumferential surface 27a1 at the upper end of the housing portion 27 opposing the outer circumferential surface 29b.

Similarly, in a state that the second sealing portion 30 having the above-mentioned constitution is fixed to the shaft member 22, the tapered second sealing space S12 whose radial dimension gradually decreases toward the top is formed between the outer circumferential surface 30b comprising the tapered face 30b1 and the inner circumferential surface 27a2 at the lower end of the housing portion 27 opposing the outer circumferential surface 30b.

After the assembly is carried out in the manner mentioned above, the lubricating oil is poured into the inner space of the housing portion 27 sealed by the sealing portions 29, 30. Accordingly, the fluid dynamic bearing apparatus 21 in which the inner space of the bearing including the inner void of the sleeve portion 28 is filled with the lubricating oil. At this time, the sum total of the capacities of the first and second sealing spaces S11, S12 is greater than an amount of change in volume caused by a change in temperature of the lubricating oil poured into the inner space of at least the fluid dynamic bearing apparatus 21. Accordingly, the oil level of the lubricating oil is always maintained with the sealing spaces S11, S12.

As already mentioned, the sealing spaces S11, S12 are formed between the outer circumferential surfaces 29b, 30b of the first, second sealing portions 29, 30 fixed to the outer periphery of the shaft member 22 and the inner circumferential surfaces 27a1, 27a2 at both ends of the housing portion 27. Therefore, the sealing spaces can be formed closer to outer diameter side than in the case where the sealing space is formed between the sealing portion fixed to the housing portion and the outer circumferential surface of the shaft member (for example, the constitution shown in FIG. 8), whereby the axial widths of the sealing portions 29, 30 can be reduced and at the same time the sealing capacities of the sealing spaces S11, S12 can be ensured. Accordingly, for example, the fixed position of the sleeve portion 28 relative to the housing portion 27 in the axial direction can be closer to the top (the disk hub 23 side) than in a known example to so that the separation distance between the bearing centers of the radial bearing portions R11, R12 and the center of gravity of the body of rotation (herein, the shaft member 22 to which the disk hub 23 is fixed) can be shortened and a value of tolerance of the fluid dynamic bearing apparatus 21 for a moment load can be increased. Alternatively, the axial width of the sleeve portion 28 can be increased while the axial dimension of the entire fluid dynamic bearing apparatus 21 is maintained as it is so that a large separation distance between the radial bearing portions R11, R12 can be ensured, which can also increase a value of tolerance for a moment load. In the former case, the axial dimension of the entire fluid dynamic bearing apparatus 21 can be reduced than in a known example, at least by decreases in the axial widths of the sealing portions 29, 30, whereby size reduction of the entire fluid dynamic bearing apparatus 21 can be achieved.

In this embodiment, since the spiral cutting marks 31 having such a configuration that can draw the lubricating oil in the first sealing space S11 into the housing portion 27 are formed on the outer circumferential surface 29b of the first sealing portion 29, the lubricating oil in the first sealing space S11 is drawn to the outer diameter portion of the thrust bearing gap of the first thrust bearing portion T11 along the spiral cutting marks 31. Accordingly, leakage of the lubricating oil filling the fluid dynamic bearing apparatus 21 to the outside of the bearing can be prevented as much as possible. In this embodiment, the inclination direction of the spiral cutting marks 31 is adjusted to coincide with the inclination direction of the upper region of the hydrodynamic grooves 23a1 of the sleeve portion 28. Therefore, especially when the shaft member 22 is in rotation, the downward drawing action of the lubricating oil by the cutting marks 31 can be further increased, thereby further improving the sealing action.

In this embodiment, since the tapered face 29b1 whose diameter decreases toward the top in the axial direction is formed on the outer circumferential surface 29b of the first sealing portion 29, the sealing space S11 between the tapered face and the inner circumferential surface 27a1 at the upper end of the housing portion 27 forms a configuration whose radial dimension gradually decreases toward the bottom (tapered configuration). Therefore, when the shaft member 22 is in rotation, leakage of the lubricating oil to the outside of the fluid dynamic bearing apparatus 21 is inhibited even more effectively by the drawing action caused by the tapered sealing space S11, and by the drawing action caused by the centrifugal force, in addition to the drawing action of the lubricating oil caused by the spiral cutting marks 31. Similarly, also in the second sealing portion 30 and second sealing space S12, when the shaft member 22 is in rotation, leakage of the lubricating oil to the outside of the fluid dynamic bearing apparatus 21 is effectively inhibited by the drawing action caused by the tapered sealing space S12, and further by the drawing action caused by the centrifugal force, in addition to the drawing action of the lubricating oil caused by the spiral cutting marks 32.

In the fluid dynamic bearing apparatus 21 having the above constitution, when the shaft member 22 is in rotation, the regions in which the hydrodynamic grooves 28a1, 28a2 of the inner circumferential surface 28a of the sleeve portion 28 are formed oppose the outer circumferential surface 22a of the shaft member 22 across the radial bearing gap. As the shaft member 22 rotates, the lubricating oil in the above radial bearing gap is pushed toward the axial center side of the hydrodynamic grooves 28a1, 28a2, and the pressure is thus increased. The first radial bearing portion R11 and the second radial bearing portion R12 which support the shaft member 22 in a non-contact manner in the radial direction by such a hydrodynamic effect of the hydrodynamic grooves 28a1, 28a2 are constituted respectively (refer to FIG. 14).

Simultaneously, oil films of the lubricating oil are formed by the hydrodynamic effect of the hydrodynamic grooves 28b1, 28c1 in the thrust bearing gap between a region for forming the hydrodynamic grooves 28b1 formed on the upper end face 28b of the sleeve portion 28 and the lower end face 29a of the first sealing portion 29 opposing this, and in the thrust bearing gap between a region for forming the hydrodynamic grooves 28c1 formed on the lower end face 28c of the sleeve portion 28 and the upper end face 30a of the second sealing portion 30 opposing this, respectively. In addition, the first thrust bearing portion T11 and the second thrust bearing portion T12 which support the shaft member 22 in the thrust direction in a non-contact manner by the pressure of these oil films are constituted.

The sixth embodiment of the present invention has been described above, but the present invention is not limited to this embodiment, and can be applied to fluid dynamic bearing apparatuses having other constitutions than those mentioned above.

In the above embodiments, the spiral cutting marks 31, 32 produced on the tapered faces 29b1, 30b1 are shown as examples of process-induced marks produced on the outer circumferential surfaces 29b, 30b by machining of the sealing portions 29, 30. However, the process-induced marks may have any other configurations as long as they has such a configuration that can draw the lubricating oil inside the sealing spaces S11, S12 into the bearing. Moreover, machining of the sealing portions 29, 30 is not limited to lathe turning either, and the above process-induced marks may be formed, for example, by grinding using a grind stone or by other means. Moreover, the sealing portions 29, 30 are not limited to those which are formed separately from the shaft member 22 and then fixed to the shaft member 22, but any one of them can be formed integrally with the shaft member 22 as long as they have the process-induced marks (cutting marks) shaped in the manner described above.

In the above embodiments, the case where the tapered sealing spaces S11, S12 are formed between the tapered faces 29b1, 30b1 provided on the outer peripheries of the sealing portions 29, 30 and the inner circumferential surfaces 27a1, 27a2 at both ends of the housing portion 27 having straight configurations are described. Contrary to this, it is also possible to render the outer circumferential surfaces 29b, 30b of the sealing portions 29, 30 straight faces and render the inner circumferential surfaces 27a1, 27a2 at both ends of the housing portion 27 tapered faces (not shown) whose diameters increase toward the outside of the bearing. Of course, both of the opposing faces 29b, 27a1 (30b, 27a2) can be tapered faces, or both can be straight faces.

In the above embodiments, the structure in which the two sealing portions 29, 30 are fixed to the shaft member 22 and the opening portions at both ends of the housing portion 27 are sealed by these, respectively, is shown as an example, but the present invention can be also applied to a fluid dynamic bearing apparatus (not shown) which has a housing portion whose one end is closed, and an opening portion at the other end is sealed by a sealing portion fixed to the shaft member.

In the above embodiments, the case where the housing portion 27 and the sleeve portion 28 are formed as separate components and the sleeve portion 28 is fixed inside the housing portion 27 is described, but these can be an integral article made of a metal or a resin (for example, refer to FIGS. 5 and 6). Alternatively, one of these components, which is made of a metal, can be an insert part and the other part can be insert-formed of a resin.

In the above embodiments, the case where the hydrodynamic pressure producing parts such as hydrodynamic grooves are formed on the inner circumferential surface 28a, upper end face 28b, and lower end face 28c side of the sleeve portion 28 is described, but the present invention is not limited to these forms. For example, it is also possible to form these hydrodynamic pressure producing parts on the side of the outer circumferential surface 22a of the shaft member 22 opposing these, the lower end face 29a of the first sealing portion 29, and the upper end face 30a of the second sealing portion 30. The hydrodynamic pressure producing parts having the form shown below can be also formed on the sides of the opposing shaft member 22 and the sealing portions 29, 30.

In the above embodiments, a constitution in which the fluid hydrodynamic effect of the lubricating fluid is produced by the hydrodynamic grooves in a herringbone shape and spiral shape is shown as an example of the radial bearing portions R11, R12 and the thrust bearing portions T11, T12, but the present invention is not limited to this example.

For example, as the radial bearing portions R11, R12, although not shown, a so-called stepped hydrodynamic pressure producing part in which grooves in the axial direction are arranged in a plurality of positions in the circumferential direction, or a so-called multirobe bearing in which a plurality of arcuate faces are arranged in the circumferential direction and wedge-shaped radial gaps (bearing gaps) are formed between the arcuate faces and the opposing outer circumferential surface 22a of the shaft member 22 may be employed. In this case, as a constitutional example of the step bearing formed between the outer circumferential surface 22a of the shaft member 22 and the inner circumferential surface 28a of the sleeve portion 28, the form shown in FIG. 9 can be employed, and the forms shown in FIGS. 10 to 12 can be employed as constitutional example of the multirobe bearing.

Alternatively, the inner circumferential surface 28a of the sleeve portion 28 can be a perfect-circle inner circumferential surface provided with no hydrodynamic grooves or arcuate faces as a hydrodynamic pressure producing part, and a so-called cylindrical bearing can be constituted by using the perfect-circle outer circumferential surface 22a of the shaft member 22 opposing this inner circumferential surface.

Although not shown, one or both of the thrust bearing portions T11, T12 can be also constituted of so-called step bearings in which a plurality of radial groove-shaped hydrodynamic grooves are provided in the regions which serve as thrust bearing faces at predetermined intervals in the circumferential direction, wave bearings (in which the steps are in the shape of waves) or the like.

It is also possible to constitute the thrust bearing portions T11, T12, for example, of so-called pivot bearings comprising a shaft member 22 with ball-shaped ends for supporting the bearing portions in a contact manner between themselves and the thrust bearing faces opposing these, instead of constituting the shaft member 22 of that which support the thrust bearing portions T11, T12 in a non-contact manner by the hydrodynamic effect of the hydrodynamic grooves.

The invention claimed is:

1. A method for producing a fluid dynamic bearing apparatus which comprises a housing portion, a sleeve portion provided inside the housing portion, a shaft member which rotates relative to the housing portion and the sleeve portion, a radial bearing portion which rotatably supports the shaft member in the radial direction by a lubricating film of a fluid produced in a radial bearing gap between the sleeve portion and the shaft member, and an annular sealing portion positioned at least one end side of the sleeve portion, the sealing portion being provided on the shaft member, a sealing space being formed on the outer circumferential surface side of the sealing portion such that the sealing portion has a tapered face formed on an outer circumferential surface, the sealing space being formed between the tapered face and an inner circumferential surface of the housing portion, an outer diameter of the tapered face gradually decreasing toward the outside of the housing portion, the method comprising steps of:

forming the tapered face of the sealing portion by machining, while simultaneously producing process-induced marks on the tapered face of the sealing portion by the machining of the tapered face, the producing process-induced marks having such a configuration that can draw the fluid inside the sealing space into the housing portion.

2. The method according to claim 1, comprising:

on the step of forming the outer circumferential surface of the sealing portion, producing spiral cutting marks as the process-induced marks by a lathe tuning process as the machining.

3. The method according to claim 2, wherein the method produces the fluid dynamic bearing apparatus which comprises the sealing portions each positioned at each end side of the sleeve portion, the method comprising:

on the step of forming the outer circumferential surface of each sealing portion, producing the spiral cutting marks whose inclination directions are different from the other sealing portion on the outer circumferential surface of the each sealing portion.

4. The method according to claim 1, the method comprises a step of:

forming the entire outer circumferential surface including the tapered face of the sealing portion by machining, while simultaneously producing the process-induced marks on the entire outer circumferential surface including the tapered face of the sealing portion by the machining of the entire outer circumferential surface including the tapered face.

* * * * *